(12) United States Patent
Wu et al.

(10) Patent No.: US 8,126,141 B2
(45) Date of Patent: Feb. 28, 2012

(54) INTERFEROMETRIC COMMUNICATION

(75) Inventors: Kuohua (Angus) Wu, Tucson, AZ (US);
Andrew L. Van Brocklin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 11/708,872

(22) Filed: Feb. 21, 2007

(65) Prior Publication Data
US 2008/0199188 A1 Aug. 21, 2008

(51) Int. Cl.
*G06K 9/60* (2006.01)

(52) U.S. Cl. .......................................... 380/54; 235/382

(58) Field of Classification Search .................... None
See application file for complete search history.

(56) References Cited

U.S. PATENT DOCUMENTS
5,734,154 A * 3/1998 Jachimowicz et al. ....... 235/492
(Continued)

FOREIGN PATENT DOCUMENTS
WO 2002-086582 A1 10/2002

OTHER PUBLICATIONS
Ming Li et al., "Optical MEMS Pressure Sensor Based on Fabry-Perot Interferometry", Optics Express, Feb. 20, 2006, vol. 14, No. 4.

*Primary Examiner* — Gilberto Barron, Jr.
*Assistant Examiner* — Shaun Gregory

(57) ABSTRACT

Embodiments of interferometric communication are disclosed.

17 Claims, 3 Drawing Sheets

U.S. PATENT DOCUMENTS

| | | |
|---|---|---|
| 6,940,631 B2 | 9/2005 | Ishikawa |
| 7,110,158 B2 | 9/2006 | Miles |
| 7,123,216 B1 | 10/2006 | Miles |
| 7,129,842 B2 | 10/2006 | Hope |
| 2004/0118931 A1* | 6/2004 | Selinfreund et al. .......... 235/492 |
| 2004/0208536 A1* | 10/2004 | Duarte ............................ 398/39 |
| 2005/0072849 A1* | 4/2005 | Jones ............................. 235/487 |
| 2005/0206991 A1* | 9/2005 | Chui et al. ..................... 359/290 |
| 2006/0047971 A1* | 3/2006 | Miyazaki et al. .............. 713/186 |
| 2006/0077533 A1* | 4/2006 | Miles et al. .................... 359/321 |
| 2007/0153243 A1* | 7/2007 | Mestha et al. ................. 353/122 |
| 2007/0153287 A1* | 7/2007 | Lin et al. ....................... 356/454 |

\* cited by examiner

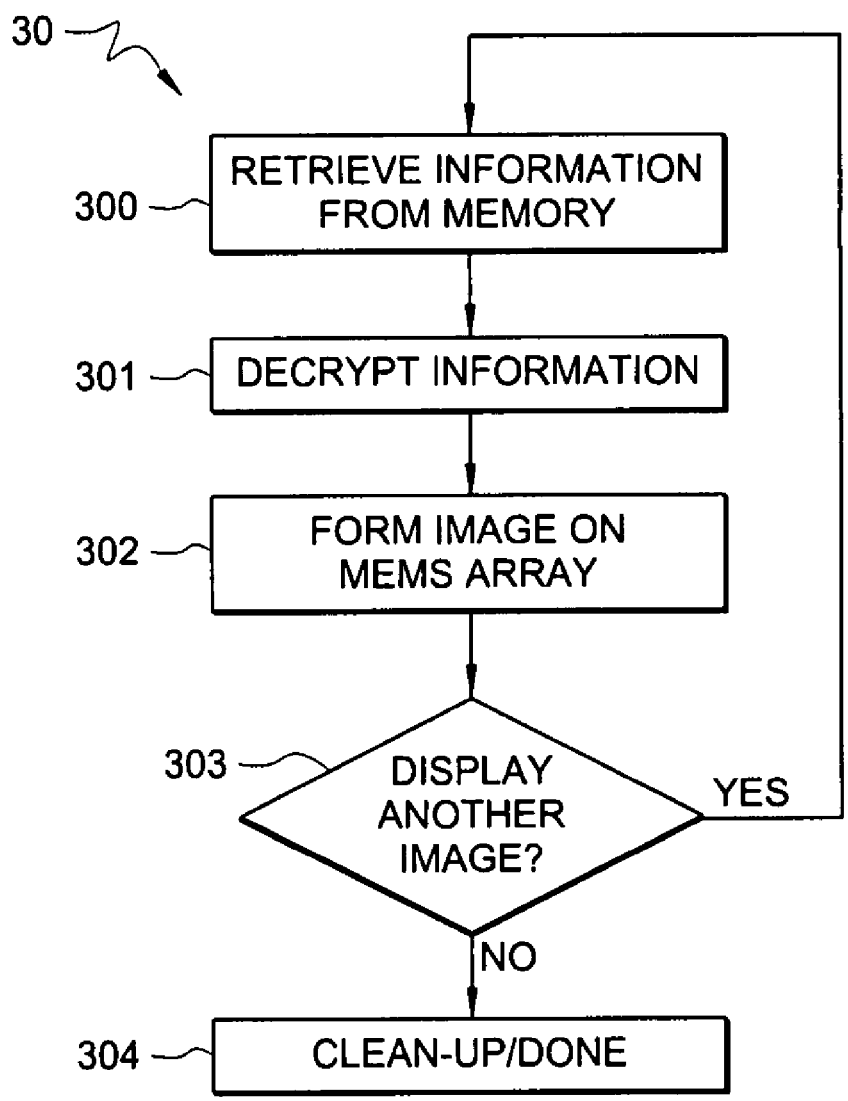

INTERFEROMETRIC COMMUNICATION

BACKGROUND OF THE INVENTION

Access card systems, such as those used for entry into secured buildings, often use radio frequency identification (RFID) or are swiped to provide and/or verify a security credential. Such systems may involve moving the card past a magnetic pick-up head at a calibrated rate, within some tolerance. If the user does not swipe the card at the correct speed, a magnetic system may not correctly identify the card.

BRIEF DESCRIPTION OF THE DRAWINGS

For a more complete understanding of the present application, the objects and advantages thereof, reference is now made to the following descriptions taken in conjunction with the accompanying drawings, in which:

FIG. 3 is a flow diagram illustrating an embodiment of an interferometric communication method.

DETAILED DESCRIPTION OF THE DRAWINGS

Figure 1:
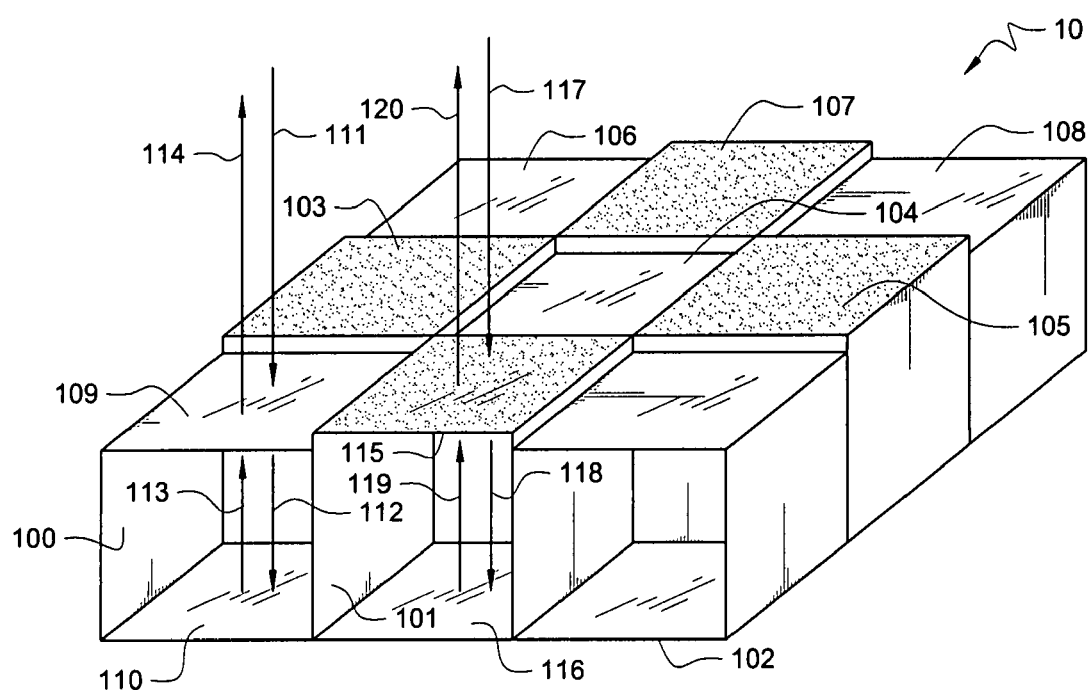
FIG. 1 is a diagram illustrating an embodiment of image formation using an embodiment of an interferometric array.

FIG. 1 is a diagram illustrating image formation using an interferometric array 10. Interferometric array 10 is a fabry-perot microelectromechanical system (MEMS) array with pixel cells 100-108. In FIG. 1, nine cells are used for illustration purposes; however, it should be understood that construction of a fabry-perot MEMS array with a greater or fewer number of cells may be used. For example, construction of a fabry-perot MEMS array comprising a greater or fewer quantity of cells may be used (e.g., in some embodiments, approximately half a million cells may be used). In the embodiment illustrated in FIG. 1, interferometric array 10 forms a checkerboard image having bright cells 100, 102, 104, 106 and 108 interspersed with dark cells 101, 103, 105 and 107. The image is formed by spatial modulation of illuminating light that is reflected by various cells 100-108. Bright cells 100, 102, 104, 106 and 108 are bright because a higher percentage of illuminating light is reflected compared to dark cells 101, 103, 105 and 107. Dark cells 101, 103, 105 and 107 reflect relatively little light illuminating light. Thus, the intensity of light reflected from bright cells 100, 102, 104, 106 and 108 is higher than the intensity of light reflected from dark cells 101, 103, 105 and 107. Alternative embodiments may modulate light that is transmitted through cells 100-108 where bright cells transmit a higher portion of the illuminating light than dark cells and dark cells block a higher portion illuminating light than bright cells.

Bright cell 100 comprises a top mirror 109 and a bottom mirror 110 which together form a resonating cavity. Top mirror 109 partially reflects incident light ray 111 and partially transmits incident light ray 111 as transmitted ray 112. Transmitted ray 112 reflects off of bottom mirror 110 to become reflected-transmitted ray 113. Reflected-transmitted ray 113 passes through top mirror 109 and joins with the reflected portion of incident ray 111 to become reflected ray 114. If the two portions of reflected ray 114 are in phase (i.e., if reflected-transmitted ray 113 is in phase with the reflected portion of incident ray 111), reflected ray 114 will cause cell 100 to appear as a bright cell. There may be multiple bounces within cell 100, oscillating between top mirror 109 and bottom mirror 110, with each bounce back toward top mirror 109 producing an in-phase component that strengthens reflected ray 114. The location of top mirror 109 relative to bottom mirror 110 will determine which wavelengths or frequencies of light are reflected by cell 110 such that cell 100 is a bright cell. For a specific distance between top mirror 109 relative to bottom mirror 110, some wavelengths of illuminating light will cause cell 100 to be a bright cell, whereas other frequencies of illuminating light will cause cell 100 to be a dark cell. Thus, the combination of the distance between top mirror 109 and bottom mirror 110 and the wavelengths of incident light ray 111 causes cell 100 to be a bright cell.

Since MEMS array 10 comprises MEMS devices which enable minute movements of minute mechanical devices such as mirrors, top mirror 109 and/or bottom mirror 110 may be moveable (e.g., independently of each other or together). A MEMS device within an array, such as top mirror 109 or bottom mirror 110, is typically actuated by introducing a voltage or electrical current to the specific MEMS device, and moves within a period of microseconds. Thus, if the wavelength of incident ray 111 is known, cell 100 may be configured electronically by moving one or both of mirrors 109 and 110 so that reflected ray 114 is bright due to constructive interference. Although cell 100 is described above, and not others, it should be understood that cells 102, 104, 106 and 108 are similarly configured and/or operate similarly.

Dark cell 101 comprises a top mirror 115 and a bottom mirror 116. Top mirror 115 partially reflects incident light ray 117 and partially transmits incident light ray 117 as transmitted ray 118. Transmitted ray 118 then reflects off of bottom mirror 116 to become reflected-transmitted ray 119. Reflected-transmitted ray 119 passes through top mirror 115 and joins with the reflected portion of incident ray 117 to become reflected ray 120. If the two portions of reflected ray 120 are out of phase (i.e., if reflected-transmitted ray 119 is out of phase with the reflected portion of incident ray 117), reflected ray 120 will cause cell 101 to appear as a dark cell. For dark cell 101, incident light may either by absorbed in cell 101, or else pass through bottom mirror 116. The location of top mirror 115 relative to bottom mirror 116 will determine which wavelengths or frequencies of light are subjected to destructive interference by cell 101. Top mirror 115 and/or bottom mirror 116 may be moveable (e.g., independently of each other or together). Thus, if the wavelength of incident ray 117 is known, cell 101 may be configured electronically by moving one or both of mirrors 115 and 116 so that reflected ray 120 is dark due to destructive interference. In the embodiment shown in FIG. 1, incident ray 111 and incident ray 117 have the same wavelength. Further, although cell 101 is described above, and not others, it should be understood that cells 103, 105 and 107 are similarly configured and/or operate similarly.

Each cell 100-108 in MEMS array 10 may be set to either bright or dark based on slight movements of top and/or bottom mirrors that cause either constructive or destructive interference of reflected light. In some embodiments, incident light (e.g., incident rays 111 and 117) is narrowband light, such as a light from a laser. Narrowband is defined herein as a bandwidth less than 10% of the center frequency. Examples of narrowband light sources include a laser and some light emitting diodes (LEDs). In other embodiments, incident light is broadband, such as white light. Broadband is defined herein as a bandwidth exceeding 10% of the center frequency. Examples of broadband light sources include white LEDs and light bulbs. For embodiments using broadband light, cells will generally appear as differently colored rather than bright and dark because a relative distance between mirrors that causes destructive interference for one color of light will cause constructive interference for a different color. For example, one cell may cause constructive interference for blue wavelength light and destructive interference for red wavelength light, while a different cell may cause constructive interference for red wavelength light and destructive interference for blue wavelength light.

Figure 2:
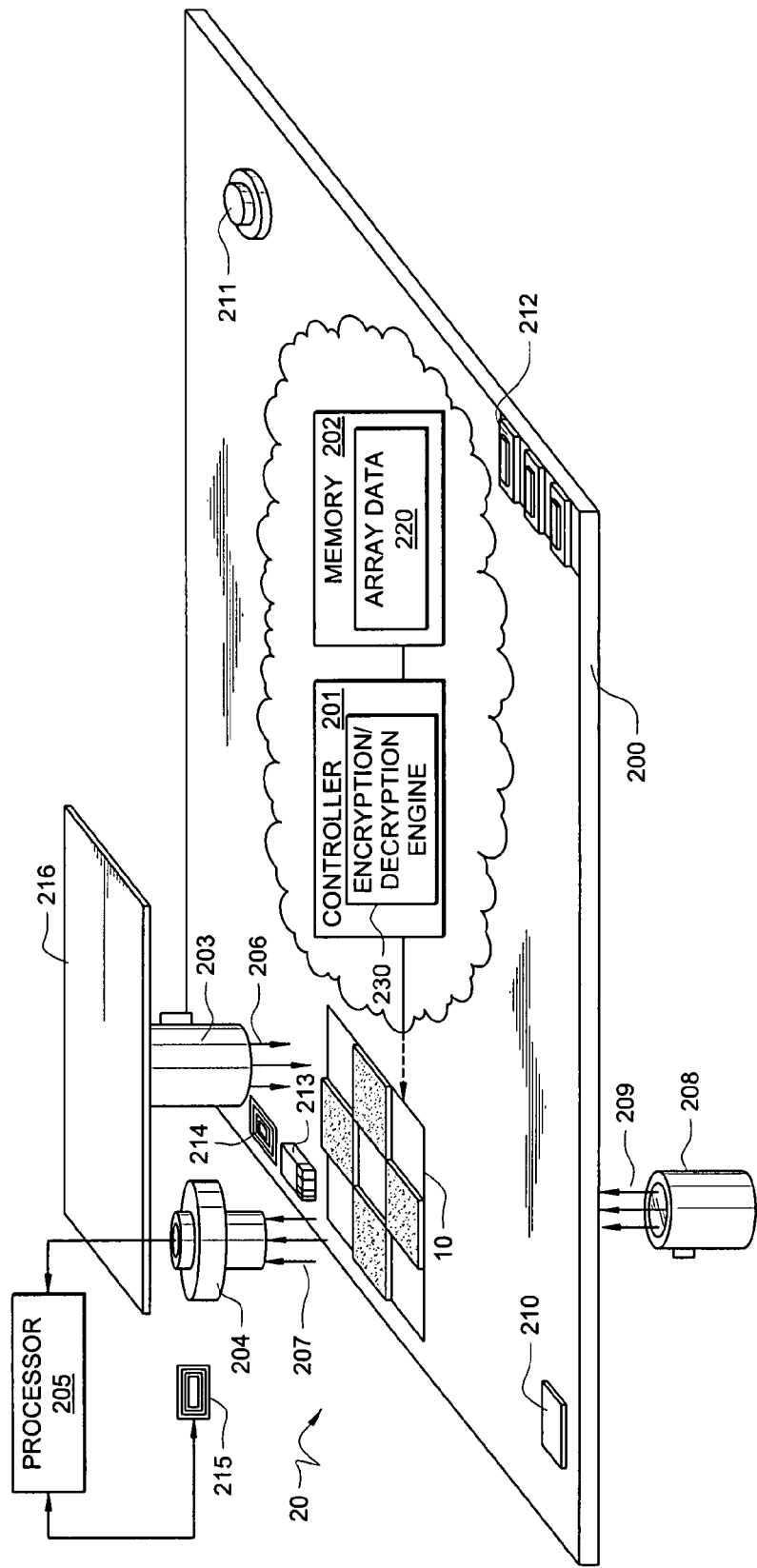
FIG. 2 is a diagram illustrating an embodiment of an interferometric communication system.

FIG. 2 is a block diagram illustrating an embodiment of an interferometric communication system 20. In the embodiment illustrated in FIG. 2, system 20 comprises an access card 200, a light source 203, an image detector 204, a processor 205, and a security shield 216. Light source 203 illuminates card 200 with incident light 206. Light source 203 may comprise a narrowband or a broadband light source. Card 200 spatially modulates incident light 206 to form an image in reflected light 207, which is captured and/or otherwise detected by detector 204. Processor 205 processes the detected image to extract information, such as a message, or security credential. Images may be used to communicate digital messages by correlating data symbols with various patterns in the image. Processor 205 compares the digital message to the contents of a database, and in some embodiments, may connect to a remote database across a computer network. Security shield 216 is used to inhibit covert viewing of the image in reflected light 207 by blocking stray portions of reflected light 207 from card 200. Security shield 216 may be located in close proximity to light source 203 and image detector 204 so that a view of reflected light 207 is blocked from most angles.

In the embodiment illustrated in FIG. 2, card 200 comprises interferometric MEMS array 10, a controller 201 and a memory 202. In FIG. 2, memory 202 comprises array data 220 having information associated with and/or otherwise used by controller 201 to control MEMS array 10 to produce an image. Array data 220 may be stored in any format that is useable by controller 201 to form images on MEMS array 10, and may include identification of specific ones of cells 100-108 that are to be configured as either bright or dark. For example, in some embodiments, controller 201 retrieves array data 220 from memory 202 and drives MEMS array 10 to form the image. The image is formed by passing one or more signals from controller 201 to MEMS array 10 that addresses cells 100-108 with a voltage and/or current that causes selected ones of cells 100-108 to actuate their respective mirrors. In some embodiments, array data 220 comprises information associated with multiple images such that a sequence of images may be generated. In this embodiment, for example, controller 201 drives MEMS array 10 to form the sequence of images by sending a series of one or more signals to MEMS array 10 to form the different images. A sequence of images can be used for information redundancy or to communicate longer messages if the information carrying capacity of a single image is insufficient. In some embodiments, the information stored as array data 220 is configured to embody and/or otherwise represent security-related information (e.g., a password, username, access code or other type of security credential) such that the image formed by MEMS array 10 based on array data 220 is indicative of the security-related information. Thus, in operation, security-related information is correlated to a particular image that may be formed by MEMS array 10 and stored as array data 220 to facilitate the security-related image formation by controller 201. In the embodiment illustrated in FIG. 2, MEMS array 10 is disposed within card 200; however it should be understood that MEMS array 10 could be installed in another device, such as a computing device or a personal device (e.g., cellular telephone, music device or a camera).

In some embodiments, the information communicated in an image produced by card 200 or used to produce an image is encrypted. For example, in some embodiments, array data 220 is stored in an encrypted format and controller 201 is configured having an encryption/decryption engine 230 configured to decrypt array data 220 to obtain information used to control MEMS array 10 for image generation. In some embodiments, controller 201 may be configured to store array data 220 in memory 202 in an encrypted format using encryption/decryption engine 230. Additionally, in some embodiments, the message communicated using MEMS array 10 may be in an encrypted format such that processor 205 or another device decrypts the message after detection by detector 204. Encryption may be desirable for certain security information communicated by card 200 such as passwords or other sensitive access credentials. Further, a message passed optically by using system 20 may use digital encoding and error detection/correction techniques such a cyclic redundancy check or a Reed-Solomon code. In some embodiments of system 20, light source 203, detector 204 and security shield 216 are in such close proximity that minimal light escapes past security shield 216, reducing the chance of data interception by a covert sensor. Any light which does escape past security shield 216 will likely be at an off-axis angle, resulting in a distorted image that renders the message content undecipherable by a covert sensor.

Additionally or alternatively, system 20 may comprise a light source 208 that is disposed on a side of MEMS array 10 the opposite side of detector 204 (e.g., in addition to or in place of light source 203). Thus, in this embodiment, rather than reflecting light from MEMS array 10, light source 208 transmits incident light 209 through MEMS array 10 to form an image or a sequence of images. Light source 208 may be disposed in and/or configured to form part of card 200 beneath MEMS array 10, or light source 208 may be external to card 200 and disposed on the opposite side of a slot from detector 204 into which card 200 is placed for reading. Light source 203 and/or light source 208 may remain on or else be actuated by a proximity sensor or a mechanical switch that indicates card 200 is in proximity of detector 204 or that a user desires to have detector 204 read an image from card 200. It should be understood, however, that alternative means may be used to activate light source 203 and/or light source 208.

In the embodiment illustrated in FIG. 1, card 200 also comprises a light sensor 210, a user-actuatable switch 211, a connector 212, a battery 213 and an inductive coupler 214, which are communicatively coupled to controller 201. Light sensor 210 is used to detect light from either light source 203 or light source 208 and trigger controller 201 to retrieve array data 220 from memory 202 and drive MEMS array 10 to generate an image or a sequence of images. Alternatively, a user actuating switch 211 can trigger the image generation. Switch 211 may comprise a depressable button, contact-based sensor, or any other type of input element. Card 200 may be configured to use either a detection of light by light sensor 210, an activation of switch 211, or involve the use of both to trigger controller 201 to begin driving MEMS array 10 to generate an image or a sequence of images. However, it should be understood that other means of triggering the display of an image may be used, including other proximity detectors such as a radio frequency identification (RFID) tag or inductive coupler 214. For example, in some embodiments, inductive coupler 214 is configured to cooperate with an inductive coupler 215 via RFID communications to: indicate a presence of card 200 proximate to light sources 203 and/or 208 or proximate to detector 204; to facilitate activation of light sources 203 and/or 208; to initiate generation of an image or series of images using MEMS array 10; and/or power controller 201 to generate one or more images using MEMS array 10.

Connector 212 is used to transfer, import and/or update array data 220 in memory 202 and/or provide external power to facilitate storage and/or changing of the image(s) displayed by card 200. Further, it should be understood that card 200 may be powered either by an internal or onboard power source (e.g., battery 213), an external battery or power source through connector 212, or by inductive coupling through inductive coupler 214. Light sensor 210 and/or inductive coupler 214 may be used to receive information wirelessly from processor 205 through light source 203 and/or inductive coupler 215.

FIG. 3 is a flow diagram illustrating an embodiment of an interferometric communication method 30. Method 30 is described with reference to system 20 illustrated in FIG. 2; however, it should be understood that method 30 may be used with alternative embodiments. At block 300, controller 201 retrieves array data 220 from memory 202 in response to a trigger event, such as the detection of incident light 206 by light detector 210, a user actuating switch 211, or a proximity detection resulting from the coupling of inductive couplers 214 and 215. Controller 201 decrypts array data 220 at block 301, and controls and/or otherwise drives MEMS array 10 to form an image at block 302. At decision block 303, controller 201 determines whether another image is to be generated/displayed. The determination may be made using a number of possible factors, including whether array data 220 indicates that another image is to be displayed, whether a user continues to actuate switch 211 to cause another image to be displayed, whether card 200 remains in proximity of detector 204, and possibly using feedback from processor 205 received by light sensor 210 and/or inductive coupler 214. If controller 210 determines that the image display is complete, controller 201 cleans up the configuration of MEMS array 10, possibly be resetting MEMS array 10 to a neutral setting which does not disclose any of the images displayed for detector 204. If, however, controller 210 determines that another image is to be displayed, method 30 returns to block 300 where another image is generated/displayed.

Thus, embodiments of system 20 enable a MEMS array to be incorporated and/or embodied on a card and/or embedded in another type of personal device to facilitate secure information and/or credential generation and transmission using images generated by the MEMS array. Embodiments of system 20 also enable multiple images to be generated using the MEMS array, thereby facilitating a sequence of secure information generation and transmittal. Further, embodiments of system 20 enables a change to the secure information stored/generated by a MEMS array and facilitates large numbers of different pixel combinations for image generation.

What is claimed is:

1. An interferometric communication system, comprising:
    a fabry-perot microelectromechanical system (MEMS) array;
    a light source to illuminate the MEMS array; and
    a controller configured to drive the light source and to drive the MEMS array to form a sequence of a plurality of security-related images
    together representing information comprising one or more of: a password, a username, and an access code, where any one of the security-related images has an insufficient information-carrying capacity to convey the information completely,
    wherein the MEMS array is to spatially modulate light transmitted by the light source to form the sequence of the security-related images.

2. The system of claim 1 wherein the MEMS array, the light source, and the controller are disposed on an access card.

3. The system of claim 1 further comprising a memory accessible by the controller and storing array data indicative of the at least one security-related image.

4. The system of claim 1 wherein the controller is configured to decrypt data used by the controller to drive the MEMS array.

5. The system of claim 1 further comprising a light sensor to detect ambient light, such that the controller is configured to drive the light source and to drive the MEMS array responsive to the light sensor detecting the ambient light.

6. The system of claim 1 further comprising a user-actuatable switch for initiating generation of the at least one security-related image.

7. The system of claim 1 further comprising an inductive coupler configured to initiate generation of the at least one security-related image.

8. An interferometric communication method, comprising:
    illuminating a fabry-perot microelectromechanical system (MEMS) array using a light source driven by a controller;
    driving the MEMS array, by the controller, to form a sequence of a plurality of security-related images
    together representing information comprising one or more of: a password, a username, and an access code, where any one of the security related images has an insufficient information-carrying capacity to convey the information completely; and,
    spatially modulating light transmitted by the light source, by the MEMS array responsive to being driven by the controller, to form the sequence of the security-related images.

9. The method of claim 8 further comprising detecting ambient light using a light sensor, such that illuminating the MEMS array and driving the MEMS array are performed responsive to the ambient light having been detected.

10. The method of claim 8 further comprising accessing a memory storing array data indicative of the at least one security-related image for driving the MEMS array.

11. The method of claim 8 further comprising forming the at least one security-related image receiving in response to user actuation of a switch.

12. The method of claim 8 further comprising decrypting data used for driving the MEMS array to form the at least one security-related image.

13. The method of claim 8 further comprising initiating generation of the at least one security-related image in response to detecting an inductive coupling.

14. An interferometric communication system, comprising:
    a fabry-perot microelectromechanical system (MEMS) array;
    a light source to illuminate the MEMS array; and
    means for controlling the light source and for controlling the MEMS array to form a sequence of a plurality of security-related images
    together representing information comprising one or more of: a password, a username, and an access code, where any one of the security-related images has an insufficient information-carrying capacity to convey the information completely,
    wherein the MEMS array is to spatially modulate light transmitted by the light source to form the sequence of the security-related images.

15. The system of claim 14 further comprising means for decrypting data indicative of the at least one security-related image and used for driving the MEMS array means.

16. The system of claim 14 further comprising means, actuatable by a user, for initiating generation of the at least one security-related image.

17. The system of claim 14 further comprising a light sensor to detect ambient light, such that the means is to drive the light source and to drive the MEMS array responsive to the light sensor detecting the ambient light.

\* \* \* \* \*